US012323296B2

(12) United States Patent
Barritt et al.

(10) Patent No.: US 12,323,296 B2
(45) Date of Patent: Jun. 3, 2025

(54) HYBRID SOFTWARE-DEFINED NETWORKING AND MOBILE AD-HOC NETWORKING ROUTING IN MESH NETWORKS

(71) Applicant: Aalyria Technologies, Inc., Livermore, CA (US)

(72) Inventors: Brian Barritt, San Jose, CA (US); Ian Coolidge, San Diego, CA (US); David Mandle, Mountain View, CA (US)

(73) Assignee: AALYRIA TECHNOLOGIES, INC., Livermore, CA (US)

( * ) Notice: Subject to any disclaimer, the term of this patent is extended or adjusted under 35 U.S.C. 154(b) by 0 days.

(21) Appl. No.: 18/066,919

(22) Filed: Dec. 15, 2022

(65) Prior Publication Data

US 2023/0119905 A1 Apr. 20, 2023

Related U.S. Application Data

(63) Continuation of application No. 17/138,019, filed on Dec. 30, 2020, now Pat. No. 11,552,849.

(51) Int. Cl.
*H04L 41/0816* (2022.01)
*H04B 7/185* (2006.01)
(Continued)

(52) U.S. Cl.
CPC ..... *H04L 41/0816* (2013.01); *H04B 7/18528* (2013.01); *H04B 7/18534* (2013.01);
(Continued)

(58) Field of Classification Search
None
See application file for complete search history.

(56) References Cited

U.S. PATENT DOCUMENTS 7,263,597 B2 8/2007 Everdell et al.
7,818,780 B1 * 10/2010 Salmi ...................... H04L 45/56
717/137

(Continued)

FOREIGN PATENT DOCUMENTS

AU  2018258169 A1  10/2019
WO  2017189051 A1  11/2017
WO  2019173127 A1   9/2019

OTHER PUBLICATIONS

Barritt Brian et al Loon SDN Applicability to NASAs next generation space communications architecture 2018 IEEE Aerospace Conference, IEEE Mar. 3, 2018 doi101109AERO20188396643, pp. 1-9 XP033365389.

(Continued)

*Primary Examiner* — Jeffrey R Swearingen
(74) *Attorney, Agent, or Firm* — BAKER, HOSTETLER LLP

(57) ABSTRACT

A network controller is configured to cause a network to implement a primary network configuration of a network and a secondary network configuration as a backup to the primary network configuration. The network controller may be configured to receive information from a plurality of nodes of a network and information related to the client data to be transmitted through the network. Based on the node information, the network controller is configured to determine available nodes and possible links in the network and then determine a topology of the network. The primary network configuration is determined based on the topology. The network controller then sends instructions to the plurality of nodes of the network to implement the primary network configuration and to switch to a secondary network configuration where a failure of the primary network configuration occurs, wherein the secondary network configu- (Continued)

ration implements mobile ad-hoc networking in the determined topology.

20 Claims, 9 Drawing Sheets

(51) Int. Cl.
    *H04L 41/08*        (2022.01)
    *H04L 41/0853*     (2022.01)
    *H04L 41/12*       (2022.01)
    *H04L 45/00*       (2022.01)
    *H04L 45/24*       (2022.01)
    *H04W 84/06*      (2009.01)
    *H04W 40/26*      (2009.01)

(52) U.S. Cl.
    CPC ...... *H04L 41/0856* (2013.01); *H04L 41/0886* (2013.01); *H04L 41/12* (2013.01); *H04L 45/20* (2013.01); *H04L 45/24* (2013.01); *H04W 84/06* (2013.01); *H04W 40/26* (2013.01)

(56) References Cited

U.S. PATENT DOCUMENTS

| | | | |
|---|---|---|---|
| 7,889,748 B1 | 2/2011 | Leong et al. | |
| 8,072,901 B1* | 12/2011 | Blair | H04L 45/04 370/254 |
| 9,832,705 B1 | 11/2017 | Newton et al. | |
| 10,187,801 B2 | 1/2019 | Mosko et al. | |
| 11,245,614 B1* | 2/2022 | Backes | H04L 12/4641 |
| 2006/0104301 A1 | 5/2006 | Beyer et al. | |
| 2008/0025209 A1 | 1/2008 | Banner et al. | |
| 2011/0103393 A1* | 5/2011 | Meier | H04W 88/16 370/401 |
| 2013/0303218 A1 | 11/2013 | Teller et al. | |
| 2016/0037434 A1 | 2/2016 | Gopal et al. | |
| 2016/0094398 A1* | 3/2016 | Choudhury | H04L 45/42 370/254 |
| 2018/0316429 A1 | 11/2018 | Barritt | |
| 2018/0343567 A1* | 11/2018 | Ashrafi | H04L 41/122 |
| 2019/0158407 A1* | 5/2019 | Chanda | H04L 49/309 |
| 2020/0037225 A1 | 1/2020 | Hung | |
| 2020/0213932 A1 | 7/2020 | Fallon et al. | |
| 2020/0296026 A1 | 9/2020 | Michael et al. | |
| 2021/0105668 A1 | 4/2021 | Thubert et al. | |

OTHER PUBLICATIONS

Barritt Brian et al: "Operating a UAV mesh & internet backhaul network using temporospatial SDN", 2017 IEEE Aerospace Conference, IEEE, Mar. 4, 2017 (Mar. 4, 2017), pp. 1-7, XP033102794, DOI: 10.1109/AERO.2017.7943701, paragraphs [002.], [005.], [007.].

EPO Search Opinion of counterpart EP application No. 19763740 dated Oct. 19, 2021.

International Search Report and Written Opinion by the ISA/EPO of PCT/2021/061749 dated Mar. 25, 2022.

Requisition by the Examiner with Search Report of the counterpart Canadian patent application No. 3093368 dated Oct. 6, 2021.

Supplementary EP Search Report of counterpart EP application No. EP 19763740 dated Oct. 19, 2021.

* cited by examiner

HYBRID SOFTWARE-DEFINED NETWORKING AND MOBILE AD-HOC NETWORKING ROUTING IN MESH NETWORKS

BACKGROUND

Information can be transmitted over directional point-to-point networks, such as aerospace and other mobile networks. In such networks, links can be formed between pairs of nodes by aiming transceivers of each node pair towards each other. In some implementations, nodes may include non-geostationary satellite orbit (NGSO) satellites or other high-altitude platforms (HAPs) that are in motion relative to the Earth.

BRIEF SUMMARY

Aspects of the disclosure provide for systems and methods for planning a primary network configuration and a secondary network configuration for the network, where the secondary network configuration serves as a backup for the primary network configuration.

Some aspects of the disclosure provide for a system that has a network controller including one or more processors. The one or more processors are configured to receive node information from a plurality of nodes of a network, the plurality of nodes including a first node that is in motion relative to a second node; determine available nodes and possible links in the network based on the received node information; determine a topology of the network based on the available nodes and possible links; receive, from one or more client devices, client data information related to client data to be transmitted through the network; determine a primary network configuration for the determined topology, wherein the primary network configuration includes one or more first routing paths for the client data; and send implementation instructions to the plurality of nodes of the network to cause the plurality of nodes to implement the primary network configuration and to switch to a secondary network configuration where a failure of the primary network configuration occurs, wherein the secondary network configuration includes one or more second routing paths for the client data through the determined topology that implements mobile ad-hoc networking.

In one example, the implementation instructions also cause each node of the network to determine a next hop in the secondary network configuration using mobile ad-hoc networking in the determined topology. In another example, the one or more processors are also configured to determine a first forwarding rule for each node of the network based on the one or more first routing paths, and the implementation instructions include the first forwarding rule. In this example, the first forwarding rule optionally includes instructions regarding forming a link in the primary network configuration.

Also optionally in this example, the implementation instructions for each node of the network include switching to a second forwarding rule for the second network configuration when the first forwarding rule cannot be implemented. In one example, the second forwarding rule is for proactive routing. In another example, the second forwarding rule is for reactive routing. In a further example, the second forwarding rule is for hybrid routing. In yet another example, the implementation instructions further include detecting a link failure to a next hop before switching to the second forwarding rule.

Other aspects of the disclosure provide for a computer-implemented method that includes receiving, by one or more processors, node information from a plurality of nodes of a network, the plurality of nodes including a first node that is in motion relative to a second node; determining, by the one or more processors, available nodes and possible links in the network based on the received information; determining, by the one or more processors, a topology of the network based on the available nodes and possible links; receiving, by the one or more processors from one or more client devices, client data information related to client data to be transmitted through the network; determining, by the one or more processors, a primary network configuration for the determined topology, wherein the primary network configuration includes one or more first routing paths for the client data; and sending, by the one or more processors, implementation instructions to the plurality of nodes of the network to cause the plurality of nodes to implement the primary network configuration and to switch to a secondary network configuration where a failure of the primary network configuration occurs, wherein the secondary network configuration includes one or more second routing paths for the client data through the determined topology that implements mobile ad-hoc networking.

In one example, the implementation instructions also cause each node of the network to determine a next hop in the secondary network configuration using mobile ad-hoc networking in the determined topology. In another example, the determining the primary network configuration also includes determining a first forwarding rule for each node of the network based on the one or more first routing paths, and the implementation instructions include the first forwarding rule. In this example, the first forwarding rule includes instructions regarding forming a link in the primary network configuration.

Also optionally in this example, the implementation instructions for each node of the network include switching to a second forwarding rule for the second network configuration when the first forwarding rule cannot be implemented. In one example, the second forwarding rule is for proactive routing. In another example, the second forwarding rule is for reactive routing. In a further example, the second forwarding rule is for hybrid routing. In yet another example, the implementation instructions further include detecting a link failure to a next hop from before switching to the second forwarding rule.

Further aspects of the disclosure provide for a non-transitory, tangible computer-readable storage medium on which computer readable instructions of a program are stored. The instructions, when executed by one or more processors, cause the one or more processors to perform a method. The method includes receiving node information from a plurality of nodes of a network, the plurality of nodes including a first node that is in motion relative to a second node; determining available nodes and possible links in the network based on the received information; determining a topology of the network for based on the available nodes and possible links; receiving, from one or more client devices, client data information related to client data to be transmitted through the network; determining a primary network configuration for the determined topology, wherein the primary network configuration includes one or more first routing paths for the client data; and sending implementation instructions to the plurality of nodes of the network to cause the plurality of nodes to implement the primary network configuration and to switch to a secondary network configuration where a failure of the primary network configuration occurs, wherein the secondary network configuration includes one or more second routing paths for the client data through the determined topology that implements mobile ad-hoc networking.

In one example, the determining the primary network configuration also includes determining a first forwarding rule for each node of the network based on the one or more first routing paths, and the implementation instructions include the first forwarding rule and cause each node of the network to determine a next hop in the secondary network configuration using mobile ad-hoc networking in the determined topology.

DETAILED DESCRIPTION OVERVIEW

Figure 1:
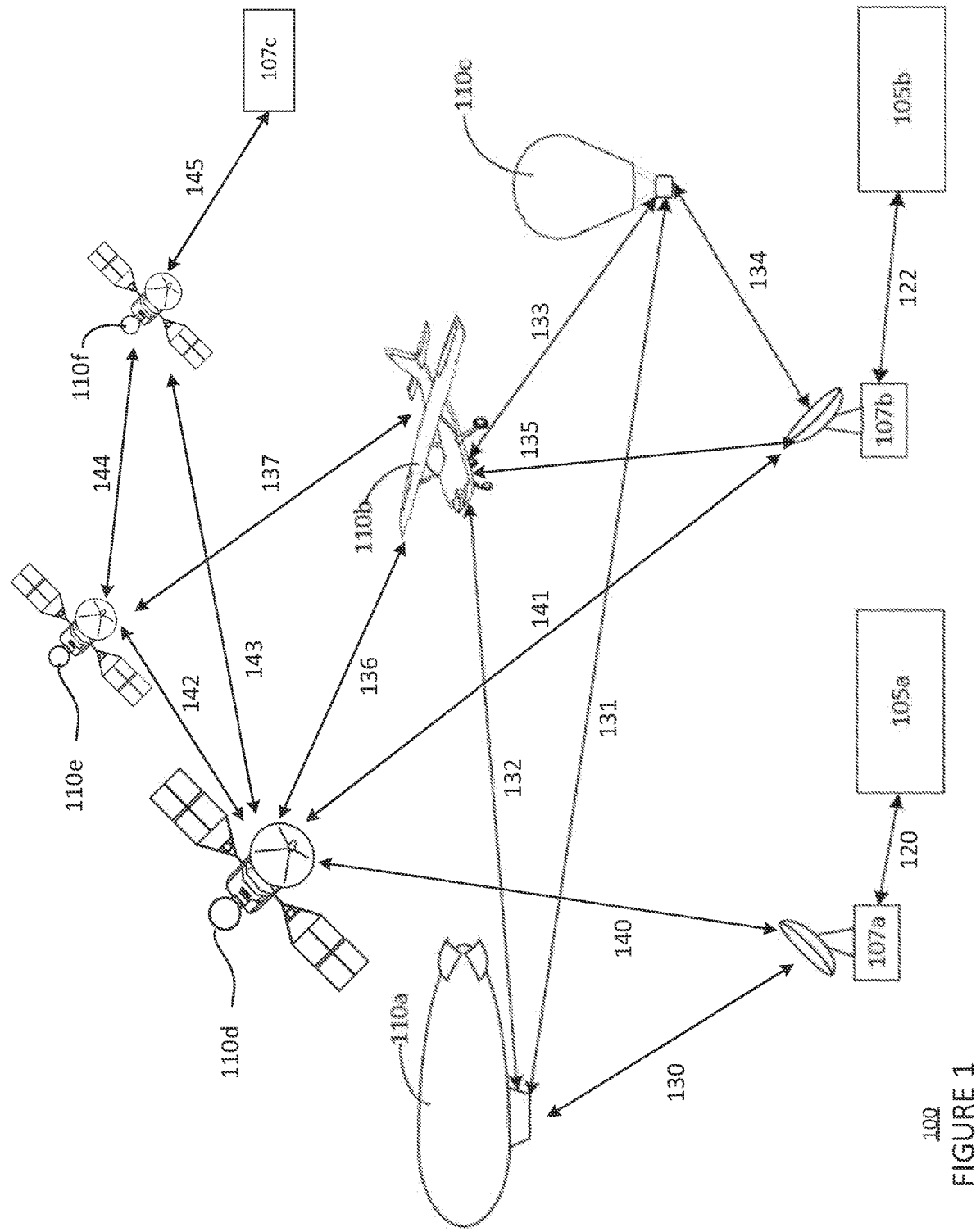
FIG. 1 is a pictorial diagram of an example directional point-to-point network 100 in accordance with aspects of the disclosure.

The technology relates to planning and implementing network configurations for a temporospatial communication network, including a primary configuration and a secondary configuration. The primary configuration may be a software-defined configuration based on locations and trajectories of nodes in the network. The second configuration may be a distributed routing protocol. When a local failure occurs at a given node, forwarding rules of the secondary configuration may be implemented to route data affected by the local failure to reduce latency in the network.

The network controller may be configured to generate a primary configuration and a secondary configuration for the network based on a topology of the network. The primary and secondary configurations may be generated to be implemented in the network at a given point in time. The primary configuration may be an overall configuration generated using software-defined networking. The secondary configuration may be generated using distributed routing protocol, such as mobile ad-hoc network (MANET) routing protocol.

The network controller may send forwarding rules for the primary configuration and the secondary configuration to one or more nodes of the network. For each node, the network controller may send one or more first forwarding rules for implementing the primary configuration and one or more second forwarding rules for implementing the secondary configuration.

A first node that receives the forwarding rules may store the one or more first forwarding rules for the primary configuration and the one or more second forwarding rules for the secondary configuration. At the given point in time, the first node may implement the one or more first forwarding rules that includes directing a signal to a second node. The first node may detect a local failure at the second node. After the local failure at the second node is detected, the first node may implement at least one of the one or more second forwarding rules that includes directing a signal to a third node.

The network controller may generate an updated primary configuration to adjust for the local failure of the second node. The updated primary configuration may be an overall configuration generated using software-defined networking in a same or similar manner as the first primary configuration. Once generated, updated forwarding rules for the updated primary configuration may be sent to the nodes of the network to be implemented. The updated primary configuration may replace any of the one or more first forwarding rules and the one or more second forwarding rules being implemented by the nodes of the network.

The technology allows for a more reliable software-defined network. Communications may be transmitted with less latency and less packet loss during events such as a local failure, while maintaining a global optimality of the software-defined network. For example, when the control plane of a primary network is carried over to a secondary network after the local failure of the primary network, the primary network may have a shorter healing time. As a result, client data may be sent and received faster or more on schedule than in other networks. The network may be capable of supporting transmission of a greater amount of data overall.

Example Systems

FIG. 1 is a pictorial diagram of an example directional point-to-point network 100. The network 100 is a directional point-to-point computer network consisting of nodes mounted on various land- and air-based devices, some of which may change position with respect to other nodes in the network 100 over time. For example, the network 100 includes nodes associated with each of two land-based datacenters 105a and 105b (generally referred to as datacenters 105), nodes associated with each of three ground stations 107a, 107b, and 107c (generally referred to as ground stations 107), and nodes associated with each of six airborne high altitude platforms (HAPs) 110a-110f (generally referred to as HAPs 110). As shown, HAP 110a is a blimp, HAP 110b is an airplane, HAP 110c is a balloon, and HAPs 110d-110f are satellites. In some implementations, a client device may be a node of the network 100 or may be directly or indirectly connected to a HAP of the network 100. For example, a client device may form a communication link with HAP 110d or, similar to datacenter 105a, may for a communication link with ground station 107a.

In some embodiments, nodes in network 100 may be equipped to perform free-space optical communication (FSOC), making network 100 an FSOC network. Additionally or alternatively, nodes in network 100 may be equipped to communicate via radio-frequency signals or other communication signal capable of travelling through free space. Arrows shown between a pair of nodes represent possible communication links 120, 122, 130-137, 140-145 between the nodes. Link 120 may be between datacenter 105a and ground station 107a, and link 122 may be between datacenter 105*b* and ground station 107*b*. HAP 110*a* may be linked to ground station 107*a*, HAP 110*b*, and HAP 110*c* via links 130, 131, and 132, respectively. HAP 110*b* may be linked to HAP 110*c*, ground station 107*b*, HAP 110*d*, and HAP 110*e* via links 133, 135, 136, and 137, respectively. HAP 110*c* may be linked to ground station 107*b* via link 134. HAP 110*d* may be linked to ground station 107*a*, ground station 107*b*, HAP 110*e*, and HAP 110*f* via links 140, 141, 142, and 142, respectively. HAP 110*f* may be linked to HAP 110*e* and ground station 107*c* via links 144 and 145, respectively.

The network 100 as shown in FIG. 1 is illustrative only, and in some implementations the network 100 may include additional or different nodes. For example, in some implementations, the network 100 may include additional HAPs, which may be balloons, blimps, airplanes, unmanned aerial vehicles (UAVs), satellites, or any other form of high altitude platform.

In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network. In some implementations, HAPs 110 can include wireless transceivers associated with a cellular or other mobile network, such as eNodeB base stations or other wireless access points, such as WiMAX or UMTS access points. Together, HAPs 110 may form all or part of a wireless access network. HAPs 110 may connect to the datacenters 105, for example, via backbone network links or transit networks operated by third parties. The datacenters 105 may include servers hosting applications that are accessed by remote users as well as systems that monitor or control the components of the network 100. HAPs 110 may provide wireless access for the users, and may forward user requests to the datacenters 105 and return responses to the users via the backbone network links.

Figure 2:
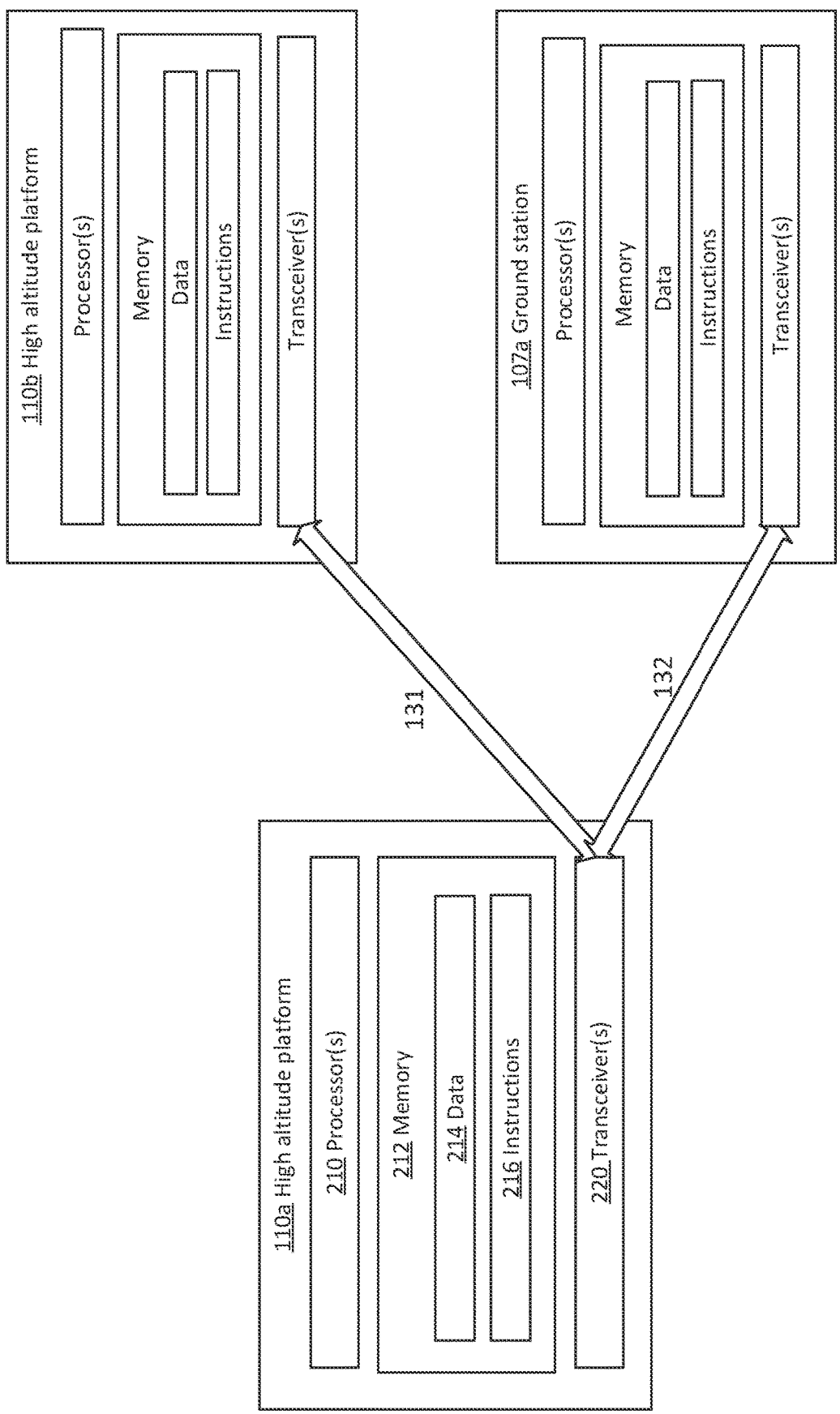
FIG. 2 is a functional diagram of a portion 200 of the network 100 shown in FIG. 1 in accordance with aspects of the disclosure.

As shown in FIG. 2, each node, such as ground stations 107 and HAPs 110 may include one or more transceivers configured to create one or more links, such as links 120, 122, 130-137, 140-145, between a given HAP 110 and another node in the network. Referring to HAP 110*a*, each of the nodes, such as ground stations 107 and HAPs 110 of network 100, may include one or more processors 210, memory 212, and one or more transceivers 220. For the sake of clarity and simplicity, only ground station 107*a* and HAPs 110*a*, 110*b* are shown in FIG. 2. However, other ground stations and HAPs in the network may have the same or as similar configuration as ground station 107*b* or HAPS 110*a*, 110*b*.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214, and instructions 216, that may be executed by the one or more processors 210. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 214 and instructions 216 are stored on different types of media. In the memory of each node, such as memory 212 of HAP 110*a*, a forwarding information base or forwarding data structure, such as a database or table, may be stored that indicate how signals received at each node should be forwarded, or transmitted. In other words, the memory of each node may store one or more forwarding rules for the corresponding node. For example, the forwarding table stored in memory 212 may include a forwarding rule that a signal received from ground station 107*a* should be forwarded to HAP 110*d*.

Data 214 may be retrieved, stored or modified by the one or more processors 210 in accordance with the instructions 216. For instance, although the system and method is not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

The instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more transceivers 220 may be mounted to actuators that can be controlled, or steered, to point in a desired direction. To form a link between two nodes, such as the node associated with the HAP 110*a* and the node associated with the HAP 110*d*, the transceivers of the respective nodes can be controlled to point in the direction of one another so that data can be sent and received between the nodes. In some implementations, the power of the signals transmitted by each transceiver can also be controlled by the one or more processors of respective nodes to facilitate formation of the links 120, 122, 130-137, 140-145 in the network 100 (see FIG. 1, for instance). For example, nodes that are separated by a relatively large distance can be configured to operate at a higher power to compensate for the reduction in signal-to-noise ratio that occurs over the distance separating the two nodes. Nodes that are spaced nearer to one another may be controlled to operate at a relatively lower power so as to save power.

Figure 3:
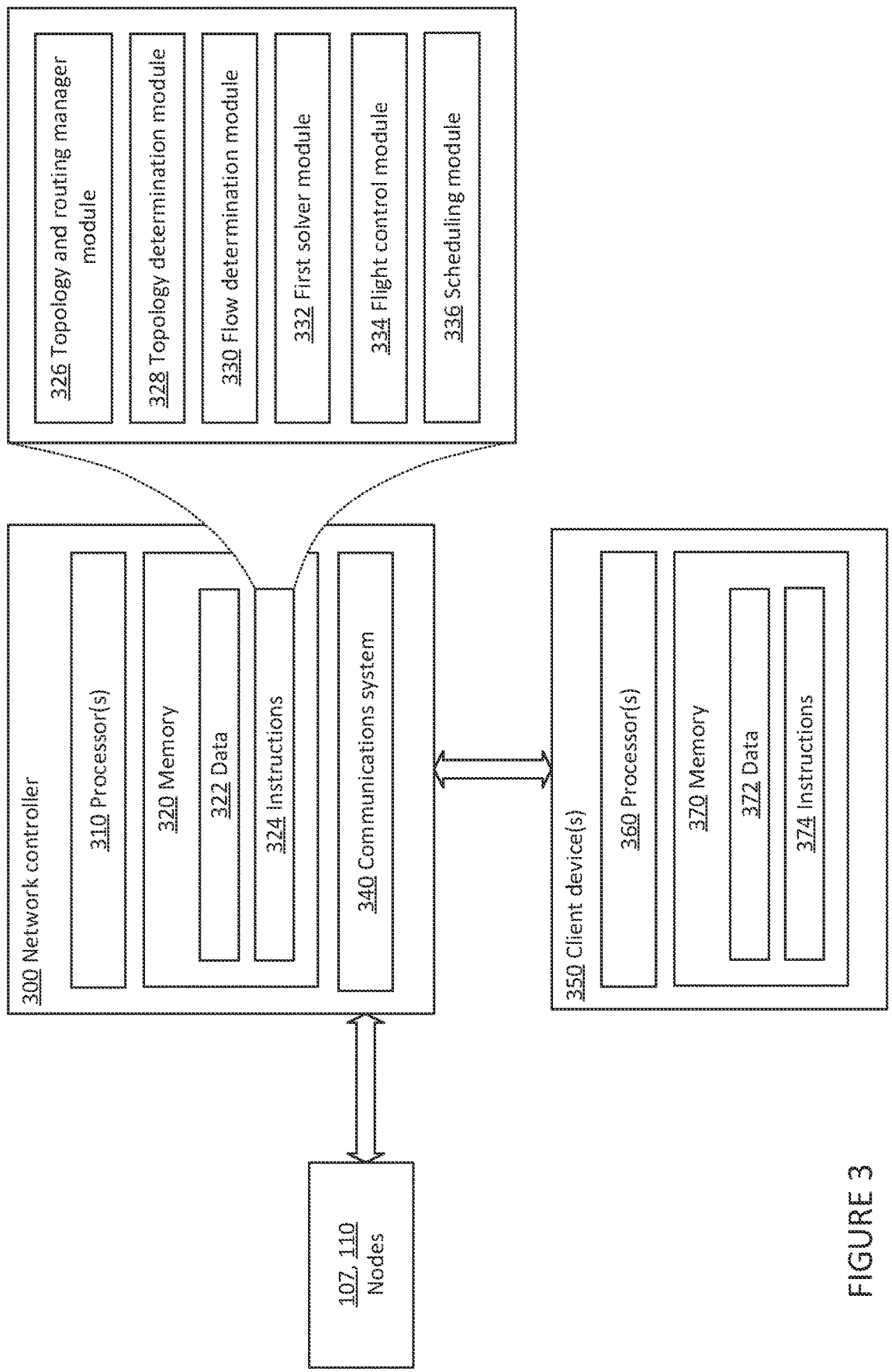
FIG. 3 is a functional diagram of a network controller 300 in accordance with aspects of the disclosure.

In some implementations, the network 100 can be an software-defined network (SDN) that is controlled by an SDN controller, such as network controller 300 depicted in FIG. 3. The network controller 300 may be located at one of the network nodes or at a separate platform, such as, for example, in one of the datacenters 105. The nodes of the network 100 can be configured to communicate with one another using the steerable transceivers, such as the one or more transceivers 220. As the HAPs 110 move with respect to one another and with respect to the datacenters 105, ground stations 107, and other ground locations over time, some of the links shown in the block diagram of FIG. 1 may become infeasible. For example, the link 130 between the ground station 107a and the HAP 110a may not be feasible when the path of the HAP 110a brings the HAP 110a into a position in which it is out of range of the ground station 107a, or in which the earth is positioned between it and the ground station 107a. In other examples, weather events between the HAPs 110 and the datacenters 105, ground stations 107, and other ground locations may also render certain links unfeasible. Thus, due to the continuous movement of the HAPs 110, the topology of the network 100 may require regular (i.e. periodic) or irregular reconfiguration to maintain connectivity and to satisfy determined network flows. The network controller 300 may be configured to determine configurations to efficiently satisfy determined network flows as further described below so as to be able to handle the demands of big data driven networking.

FIG. 3 is a functional diagram of network controller 300. The network controller 300 may be configured to send control messages to the network 100 to configure the topology of the network 100, to pass routing information to the nodes 107, 110 of the network 100, and to schedule changes to the topology of the network 100 to transmit client data. As shown in FIG. 3, the network controller 300 may include one or more processors 310, memory, 320, and communications system 340. The one or more processors 310 may be similar to the one or more processors 210 described above.

Memory 320 may store information accessible by the one or more processors 310, including data 322 and instructions 324 that may be executed by processor 310. Memory 320, data 322, and instructions 324 may be configured similarly to memory 212, data 214, and instructions 216 described above. The data 322 may include a database, table, or other storage structure representing all of the available nodes and possible links in the network 100 at a given time or time frame, such as a table. The table may have a column for every node and link in the network 100 and a row for a time or time frame. In some cases, the columns and the rows may be reversed. The table may also store, for each node and each link, scheduled times or time frames during which the node or link is available. Alternatively, a graph or other form of information organization may be used. The instructions 324 may include a topology and routing manager module 326, a topology determination module 328, a flow determination module 330, a solver module 332, a flight control module 334, and a scheduling module 336.

Returning to FIG. 3, the communications system 340 may be configured to communicate with the nodes 107, 110 of network 100 as well as one or more client devices 350. In some embodiments, the communication system 340 includes a Control to Data-Plane Interface (CDPI) driver configured to communicate with a CDPI agent at each of the nodes 107, 110. In addition, the communications system 340 of the network controller 300 may include one or more northbound interface (NBI) agents configured to communicate with an NBI driver at each client device 350 associated with one or more SDN applications. The communication system 340 may optionally or alternatively be configured to transmit and receive a signal via radio frequencies, optical frequencies, optical fiber, cable, or other communication means to and from the nodes 107, 110 in the network 100 and the one or more client devices 350.

Each client device 350 may be a personal computing device or a server with one or more processors 360, memory 370, data 372, and instructions 374 similar to those described above with respect to the one or more processors 210 and 310, memories 212 and 320, data 214 and 322, and instructions 216 and 324. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices 350 may include any device capable of processing instructions and transmitting data to and from humans and other computers including general purpose computers, network computers lacking local storage capability, and set-top boxes for televisions. In some embodiments, client devices may be associated with one or more SDN applications and may have one or more NBI drivers.

Turning to the modules of the instructions 324 of FIG. 3, the topology and routing manager module 326 may cause the one or more processors 310 to interface between the network controller 300 and the network 100. Using the topology and routing manager module 326, the one or more processors 310 may receive information from each of the nodes within the network 100. For example, in some implementations, the topology and routing manager module 326 may cause the one or more processors 310 to receive information from each node 107, 110 in the network 100 corresponding to the current location of each node, the predicted path of each node, the current links associated with each node, the routing information stored by each node, and the current storage capacity, for instance how many free or available bits can be utilized if any, at each node. Information received from each node may also include weather conditions, turbulence, radiation, or other reports regarding other conditions that may affect FSOC between nodes. Each node also may send to the one or more processors 310 information corresponding to any failed links, which may occur due to unforeseen obstructions between nodes, turbulence at a node, or failure of one or more transceivers.

The topology and routing manager module 326 may also cause one or more processors 310 to receive predicted link metrics and conditions. For example, a predicted link metric may include a predicted value of a network performance metric for a hypothetical link that may be formed currently or in the future based on information received from the nodes 107, 110. Network performance metrics may include bandwidth capacity, latency, or link lifetime duration, and can be based on the predicted relative motion or trajectory of the nodes 107, 110 in the network 100. Link lifetime duration may represent the period of time during which a link is feasible in the network 100. Weather forecasts in node locations, predicted node locations or predicted links may also be received by the one or more processors 310 from the nodes 107, 110 or optionally from a remote system.

Using the topology and routing manager module 326, the one or more processors 310 may store the information received from the network 100 in the memory 320. For instance, the table that represents all of the available nodes and possible links in the network 100 may be updated or annotated with information relevant for a particular node or link in the table. The annotations of the table may indicate availability of each node in the network 100, current and future locations of each node, current and future expected weather conditions, as well as a current amount of available storage at each of the nodes and a future (estimated) amount of available storage at each of the nodes in the network. In addition, the annotations of table may indicate the current and future availability of particular links as well as the current and future expected bandwidth for such links. Failed links and forecasted conditions may also be noted and stored in the table.

The topology determination module 328 may cause the one or more processors 310 to determine a current or future topology of the network 100. The determination of the current topology of the network 100 may be made based on the information received and stored by the one or more processors using the topology and routing manager module 326. For example, the topology determination module 328 may cause the one or more processors 310 to aggregate the information relating to the current location of each node 107, 110, the links 130-137, 140-145 formed between each pair of nodes, and any failed links that may exist within the network 100. The one or more processors 310 may receive this information through use of the topology and routing manager module 326, or may retrieve this information from the memory 320.

Additional information may also be used by the one or more processors 310 using the topology determination module 328 to determine the current topology of the network 100. Predicted link metrics received by the one or more processors 310 using the topology and routing manager module 326 and may also be used to determine the bandwidth, quality of service, and other characteristics of available links in the current topology. In some implementations, using the topology determination module 328, the one or more processors 310 may also receive information through using the flight control module 334 corresponding to the flight paths of the airborne network nodes, such as HAPs 110, at a particular time or over a particular time frame at or near the current time, and the determination of the current topology may be made based also on the received flight information.

To determine a future topology of the network 100, the one or more processors 310 may aggregate location information, predicted link conditions, flight information, available storage and/or weather forecasts related to a future time using the topology determination module 328. The one or more processor 310 may access the information stored in the table or elsewhere in the memory 320 regarding available nodes and links at the future time, location information, predicted link conditions, flight information, and/or weather forecasts. The information for the future time may be used by the one or more processors 310 to determine where nodes are predicted to be and what the availability of nodes and links and storage capabilities at each node are predicted to be at the future time.

The topology determination module 328 may cause the one or more processors 310 to store the current or future topology or other topology information in the memory 320, such as by generating and or updating the table representing all of the available nodes and possible links in the network 100 and the scheduled times or time frames associated with each node or link.

The flow determination module 330 may cause the one or more processors 310 to determine all of the flows that are determined in the network 100 at a given time or time frame. A given flow may be one or more requirements for a routing path through the network 100. For example, each flow may comprise a start station, an end station, a time frame, a minimum bandwidth, or other requirement for transmission. The one or more processors 310 may determine the flows based on the topology information determined using the topology determination module 328 and/or information regarding characteristics of client data of the one or more client devices 350. The client data information may be received by the one or more processors 310 using the scheduling module 336 as described below from the one or more client devices 350 or a remote system The client data information may include the sources and destinations for client data, an amount of client data to be transmitted, and/or a timing for transmission of client data. The amount of data may additionally or alternatively be an estimated average amount of data to be transmitted from or to a particular ground station or ground stations in a geographic area over a period of time.

The minimum bandwidth of a flow may be preset or predetermined by the one or more processors 310 given available system resources and link capabilities or alternatively, may be determined based on requirements included in the client data. Larger bandwidths may be set for flows transporting larger amounts of data. The one or more processors 310 may determine a flow between a start station and a destination station through the network capable of transmitting the amount of client data at the requested time. In some embodiments, the one or more processors 310 may also determine other information related to determined flows, such as the class of service or quality of service for each determined flow. The other information may be based on requirements received from the client device.

In some implementations, the flow determination module 330 may cause the one or more processors 310 to aggregate the client data from the one or more client devices 350 to determine the total amount of bandwidth required between each node pair in the network 100. The aggregated client data may be stored, for example, in the memory 320. Furthermore, the client data may be aggregated at a granular level. For example, the network data for each pair of nodes may be aggregated by class of service, quality of service, or any other relevant network traffic discriminator. The flows may be determined further based on any relevant network traffic discriminator.

In other cases, historical client data trends may be used to predict the client data amounts, sources, and destinations at a future point in time. The flow determination module 330 may cause the one or more processors 310 to determine a plurality of available flows between every node directly connectable to a client device at the future point in time. Directly connectable nodes, such as ground stations 107, may be able to communicate with a client device without use of the network 100. The predicted client data amounts between each node pair may be used to determine the bandwidth requirements between each node pair.

Alternatively, in the absence of client data information, the one or more processors 310 may determine a plurality of available flows between every node directly connectable to a client device at the current or future time. The determination of the plurality of available flows may be based on the current or future topology. In addition, the determination may be based on minimum system requirements.

The flow determination module 330 may cause the one or more processors 310 to store the determined flows in the memory 320. In some examples, the one or more processors 310 may annotate the table with the flows.

The solver module 332 may cause the one or more processors 310 to generate a network configuration or a schedule of network configurations based on the topology of the network, such as based on the topology represented in the table stored in the memory. The network configuration(s) generated using the first solver module may be a primary configuration to be implemented over other possible configurations. The network configuration may represent a feasible network topology that is capable of satisfying all determined network flows and may include a list of nodes and links that would be in use in the feasible network topology and a schedule of when the nodes and links would be in use. The schedule of network configurations may represent a feasible series of network topologies that are capable of satisfying all determined network flows. The feasible series of network topologies may include a list of nodes and links and a schedule of when the nodes and links would be in use for each network configuration in the schedule of network configurations. In some examples, the feasible series of network topologies includes a network topology during which data may be stored at a node having available storage and a next network topology in which the node forms a new connection or link with another node and transmits the data via the newly established link.

The network configuration(s) may be generated by the one or more processors 310 based on the topology for a given point in time in the table and on the network performance metrics of the topology at the given point in time. Various network performance metrics, such as, for example, link bandwidth, link latency, flow bandwidth, flow priority, link switching time (i.e., the time required to implement a new topology in the network 100), link duration, and/or topology duration, may be modeled as weighted constraints for the topology at the given point in time. In some embodiments, one or more network performance metrics may not be included in the table stored in the memory, but may be received from another module, another node, or from a remote system.

The one or more processors 310 may also compute routing paths for the determined flows over the topology represented by the network configuration. A given routing path may be one way to implement a given flow that satisfies the determined flow requirements and may include specific nodes and links in the network, or a list of hops between a series of nodes. In some examples, the given routing path may include a node having available storage that satisfies the determined flow requirement regarding an amount of data to be transmitted through the network. Data following the given routing path may be stored at the node for a period of time before travelling to a next hop.

In addition, information corresponding to a previous state of the network and a previous network topology may also be used to determine the network configuration or the schedule of network configurations. For example, the one or more processors 310 may generate the network configuration based on at least in part a number of changes from the previous network topology required for the network to implement the network configuration and an amount of time required for the network to make the number of changes. The one or more processors 310 may alternatively generate the schedule of network configurations based on at least in part a number of changes between network topologies of the network configurations in the schedule of network configurations and the amount of time between changes utilizing the information of routing tables. For example, changes may include steering a transceiver to point in a new direction or changing a forwarding rule in a forwarding table stored at a memory of a node. Steering the transceiver may take more take than changing the forwarding table stored at the memory of the node. The generated network configuration may require a number of changes is below a threshold number and/or the amount of time below a threshold amount of time.

For some pairs of subsequent network configurations in the schedule of network configurations, the difference between the earlier network configuration and the later network configuration may be a single change that may not involve changing the direction of transceivers, such as a routing change at a single node.

After the one or more processors 310 has generated the network configuration and routing paths using the solver module 332, the one or more processors 310 may control the nodes of the network 100 according to the topology and routing manager module 326 to implement the topology represented by the generated primary configuration by sending implementation instructions to the nodes to cause the nodes to form the links included in the generated primary configuration (e.g., by steering their respective transceivers, adjusting their respective transmission power levels, setting their transmission and reception frequency bands, etc.) and update forwarding rules in the forwarding tables stored at the memory at each node according to the computed routing paths for the primary configuration and the secondary configuration. For example, for each node, the network controller may send one or more first forwarding rules for implementing the primary configuration. Some forwarding tables may be updated with a schedule of changes based on the schedule of network configurations and may also include instructions to store data at a node before a next hop.

In addition, the network controller may also send instructions to switch to a secondary network configuration when there is a failure in the primary network configuration. In this implementation, the one or more first forwarding rules may be sent with an indication of priority that causes the first forwarding rules to be stored in a manner so as to be implemented before any other forwarding rules at each node. The other forwarding rules may include one or more second forwarding rules for the secondary network configuration. The secondary configuration may include one or more routing paths between nodes of the network to be used as a backup for when the circumstances do not allow for the primary configuration to be used at one or more locations in the network. In particular, the secondary configuration may implement a distributed routing protocol, such as mobile ad-hoc routing protocol. For example, the secondary configuration may include one or more routing paths between a given node and one or more other nodes in the network via available nodes and links, such as those in the topology generated for the primary configuration.

The flight control module 334 may cause the one or more processors 310 to generate flight instructions for the airborne nodes, such as HAPs 110, regarding the flight paths of the airborne nodes. For example, the one or more processors 310 may be unable to determine a network configuration using the solver module 332 representing a network topology that is capable of satisfying all of the determined network flows. The one or more processors may determine that the reasons for this failure using the solver module 332 is that one or more of the airborne network nodes in the network 100 has travelled too far from the other network nodes to be able to form a link. In response, using the flight control module 334, the one or more processors 310 may generate and transmit flight instructions for the airborne nodes of the network 100 that cause the airborne nodes to alter their flight paths such that additional links may be formed. For example, the flight instructions may cause the airborne nodes to move closer to one another or to avoid obstructions. After the nodes have been repositioned according to the flight instructions generated by the one or more processors using the flight control module 334, an updated table may be created using the topology and routing manager module 326 or the topology determination module 328 based on the new locations of the network nodes. Then, the updated table may be processed by the one or more processors 310 using the solver module 332 to determine a network configuration.

The scheduling module 336 may cause the one or more processors 310 at the network controller 300 to interface with the one or more client devices 350. Using the scheduling module 336, the one or more processors 310 may receive from a client device 350 client data information to be transmitted through the network 100, such as, for example, the sources and destinations for the client data. Other information received from the client device 350 may include data related to client demand, such as amount of client data to be transmitted and a timing for transmission. The information may be stored in memory 320 and/or used according to the flow determination module 330 to determine the determined flows through the network 100. In some implementations, the one or more processors 310 of network controller 300 may request client data information from the one or more client devices 350 based on available bandwidth at the given ground station or the given geographic location using the scheduling module 336.

After the determined flows are determined using the flow determination module 330 and the network configuration is generated using the solver module 332 as described above, the one or more processors 310 may generate routing instructions for transmitting the client data through the network 100 based on the table and the generated network configuration. These routing instructions may include a source location of the client data, a destination location of the client data, and a timing for the transmission of the client data. In some embodiments, the routing instructions may include storage instructions to a node to temporarily store data from a previous node to be transmitted to a next node. The routing instructions may include a schedule that may be stored at a node of the network in directly connectable with the client device 350 sending the client data. The one or more processors 310 may then send the routing instructions to the node directly connectable with the client device 350 to cause the node to receive and initiate transmission of the client data over the determined flow in accordance with the schedule.

In some embodiments where flows are determined without client data information, the scheduling module 336 may cause the one or more processors 310 to send a message to a client device of the one or more client devices 350 regarding indicating availabilities of flows through the network based on the determined flows determined using the flow determination module 330 and the network configuration generated using the solver module 332. The message may also include a time or a time frame at which the flows are available and/or a price for transmission of the data associated with each flow. Using the schedule module 336, the one or more processors 310 may receive a response from one of the one or more client devices 350 that includes a request to use one of the determined flows for transmitting client data. The one or more processors 310 may then send routing instructions to the one or more nodes to initiate transmission of the client data over the determined flow.

Example Methods

Figure 4:
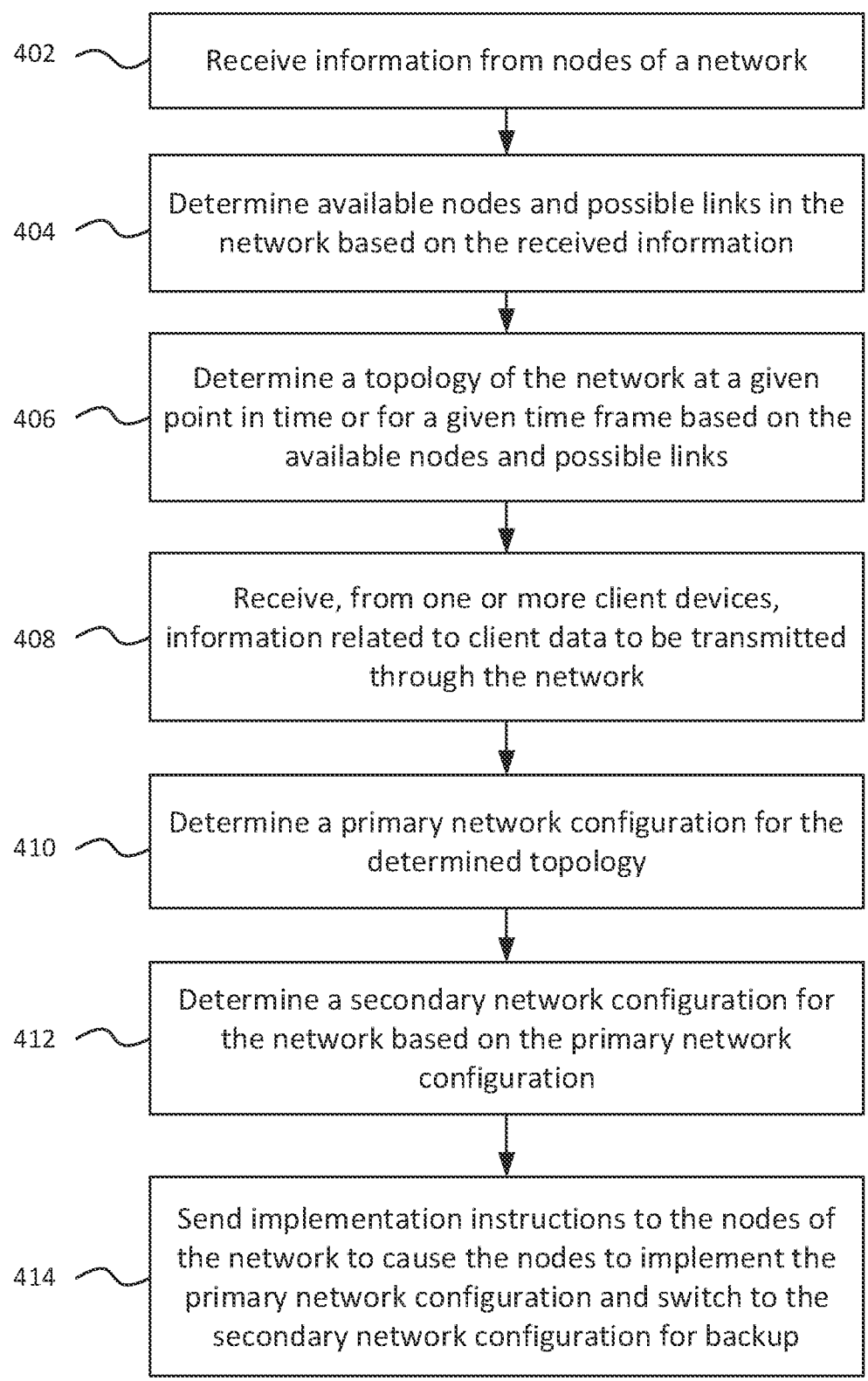
FIG. 4 is a flow diagram 400 of a method in accordance with aspects of the disclosure.

In addition to the systems described above and illustrated in the figures, various operations will now be described. The one or more processors 310 may generate a primary network configuration to be implemented in a network with instructions to implement a secondary network configuration where the primary network configuration experiences failures as described below. In FIG. 4, flow diagram 400 is shown in accordance with some of the aspects described above that may be performed by the one or more processors 310 of the network controller 300. Additionally or alternatively, one or more processors of a node may perform one or more of the operations. While FIG. 4 shows blocks in a particular order, the order may be varied and that multiple operations may be performed simultaneously. Also, operations may be added or omitted.

At block 402, the one or more processors 310 of the network controller 300 may receive information from each of the nodes within the network 100 using the topology and routing manager module 326. Information may be related to the current or predicted condition of the nodes, weather, or links at a current time or a future time. In an example scenario, location A may be received as the current location of HAP 110a at a current time; location B may be received as the current location of HAP 110b at the current time; location C may be received as the current location of HAP 110c at the current time, location D may be received as the current location of HAP 110d at the current time; location E may be received as the current location of HAP 110e at the current time; and location F may be received as the current location of HAP 110f at the current time. The weather conditions report from HAP 110a, 110c, 110d, 110e, and 110f may indicate that the current weather conditions are clear at locations A, C, D, E, and F, and the weather conditions report from HAP 110b may indicate that the current weather conditions include a thunderstorm near location B in the direction of HAP 110e. HAP 110a may also send an indication to the one or more processors 310 that HAP 110c has been unresponsive to requests to for a link 131. In addition, HAP 110a may be predicted to travel from location A to location G in one hour from the current time, and HAP 110d may be predicted to travel from location D to location H in one hour from the current time. The weather forecast for one hour from the current time may include a thunderstorm between location H and the location of ground station 107a. For links in the network 100 or each subnetwork of the network 100, information related to bandwidth, latency, or link lifetime duration may be received by the one or more processors 310. For example, information for links in the network 100 may include how much bandwidth is available.

At block 404, available nodes and possible links in the network 100 may be determined based on the information received from the nodes of the network using the topology and routing manager module 326. In some implementations, the determined available nodes, possible links, and corresponding data may be stored in the memory 320, such as in a table. In the example scenario, based on the received information, HAP 110*a* is determined to be available at location A where the weather is currently clear, and HAP 110*a* is predicted to be at location G in one hour. For HAP 110*b*, it is determined as available at location B where the weather is generally clear at location B except for a thunderstorm in one direction towards HAP 110*e*. For HAPs 110*c*, 110*e*, and 110*f*, it is determined as available at respective locations C, E, and F where the weather is also currently clear. For HAP 110*d*, it is determined as currently located at location D, and predicted to be at location H in one hour, where the weather will include a thunderstorm at that time between location H and the location of ground station 107*a*.

In addition, links 130, 132-136, and 140-145 are determined as available at the current time (shown in FIG. 5 as solid arrows), while links 131 and 137 are not available (shown in dash-dot lines). For link 131, it may be determined that the link 131 has failed at the current time based on the indication of unresponsiveness of HAP 110*c* to requests from HAP 110*a*. For link 137, it may be determined that the link 137 is unavailable at the current time due to the thunderstorm between HAP 110*b* and HAP 110*e*. For link 140, it may be determined that the link 140 is not available at the future time due to the thunderstorm between HAP 110*d* and ground station 107*a*. Available nodes and possible links may also be determined for a different point in time other than the current time based on predicted future locations of nodes or predicted conditions at each node, such as weather forecasts.

Figure 5:
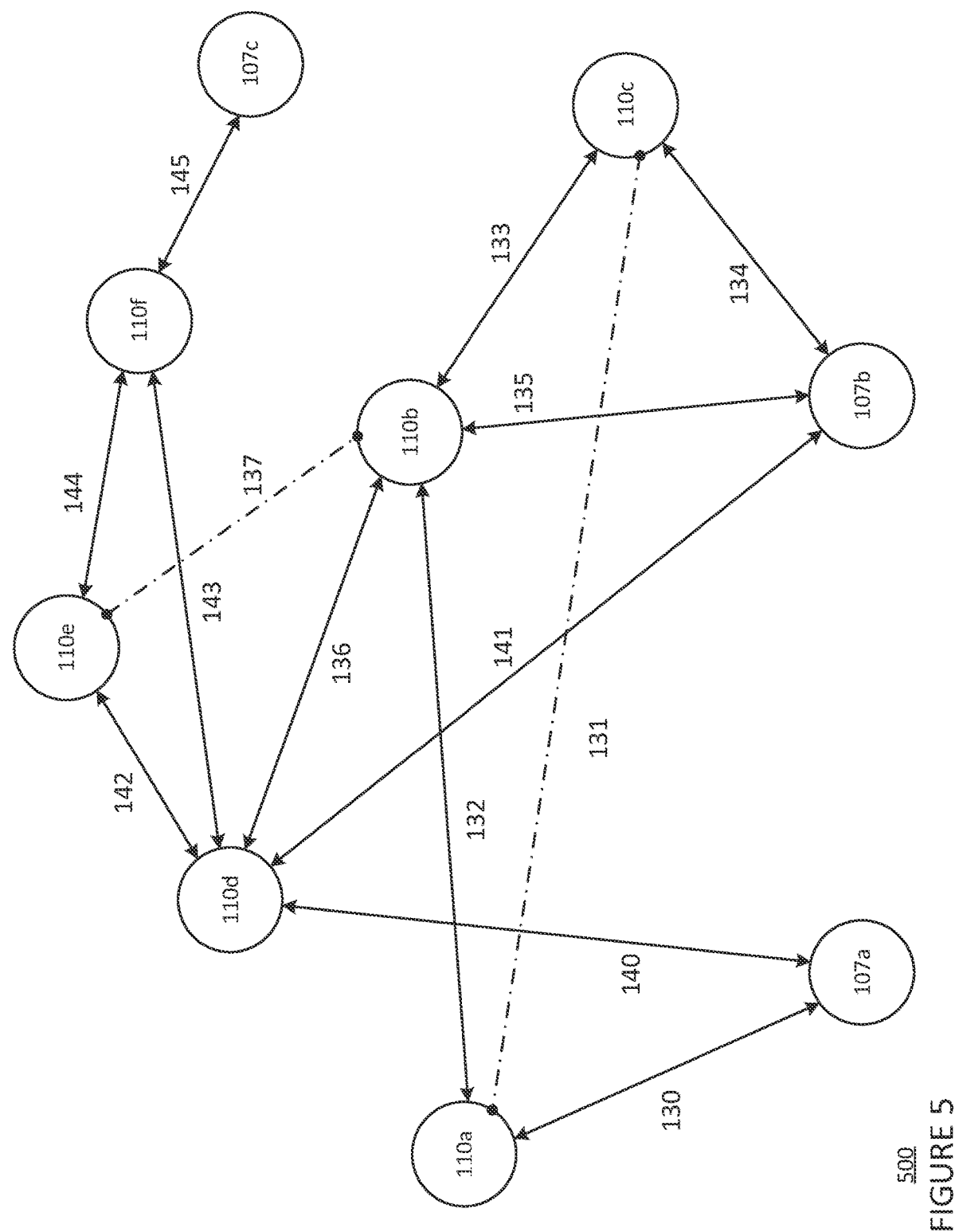
FIG. 5 is a functional diagram of a topology 500 of the network 100 shown in FIG. 1 in accordance with aspects of the disclosure.

At block 406, the one or more processors 310 may determine a topology of the network at a given point in time or for a given time frame based on the available nodes and possible links using the topology determination module 328. In some implementations, the one or more processors 310 may access the table, or other data structure, indicating available nodes and possible links in the memory 320. For the example scenario, to determine the current topology, the one or more processors 310 may determine from the table and the scheduled times associated with each node and link which nodes and links are available at the current time. According to the received information about HAPs 110*a*-110*f*, a current topology 500 may be determined as shown in FIG. 5. The current topology may be determined to include nodes 107, 110. Specifically, HAP 110*a* may be included in the current topology at location A, HAP 110*b* at location B, HAP 110*c* at location C, HAP 110*d* at location D, HAP 110*e* at location E, and HAP 110*f* at location F since these are the locations associated with the respective HAPs for the current time as determined at block 404. As shown by the arrows in the current topology 500, links 130, 132-137, and 140-145 are included in the current topology, while the links 131 and 137, which are indicated as failed for the current time according to block 404, are not included (shown as a dash-dot line without arrows in FIG. 5). In another example, if HAP 110*c* did not report its location at location C to one or more processors 310 but previously reported a flight path or a trajectory using the flight control module 334, the one or more processors 310 may determine that HAP 110*c* currently is at location C based on the flight path or trajectory and include HAP 110*c* in the current topology. In some implementations, each possible link 130, 132-136, and 140-145 in the current topology may also be labeled with link metrics, such as bandwidth, that are determined based on the received information.

At block 408, information related to client data to be transmitted through network 100 may be received by the one or more processors 310 using the scheduling module 336. The client data information may be received from one or more client devices in proximity to a given ground station or in a geographic area that are in communication with the network controller 300. The client data information may include an amount of data, a source location, and a destination location of the client data, and a requested time of transmission. For example, in the example scenario, the received information may indicate that, for a first client data, the amount of client data is 10 Gb, the source location for the first client data is ground station 107*b*, the destination location is ground station 107*a*, and a requested time of transmission is the current time. The amount of data may additionally or alternatively be an estimated average amount of data to be transmitted from or to the given ground station or client devices or ground stations in the given geographic area. In some cases, the information also includes transmission requirements, such as bandwidth, class of service, quality of service, etc. In some embodiments, information related to client data may be predicted by the one or more processors 310 of the network controller 300 or by a remote system.

At block 410, a primary network configuration 700 for the determined topology 500 may be determined by the one or more processors 310 using the solver module 332. The primary network configuration 700 may be determined by determining flows through the topology for the client data according to the received client data information, such as the information received at block 408, and selecting one or more flows through the topology as routing paths for the client data. For example, the primary network configuration 700 includes all of the available nodes and links at the current time, notably omitting links 131, 137 and node 110*e*. As shown in light colored arrows in FIG. 6, a first routing path in the topology 500 for the first client data may include routing path portions between ground station 107*b* to ground station 107*a*. A first routing path portion is from ground station 107*b* through link 135 to HAP 110*b*, a second routing path portion is from HAP 110*b* through link 132 to HAP 110*a*, and a third routing path portion is from HAP 110*a* through link 130 to ground station 107*a*.

Other client data to be transmitted from ground station 107*b* to ground station 107*a* may be transmitted along the same routing path as for the first client data or may be determined to be transmitted at least partially along a second routing path from ground station 107*b* to ground station 107*a* due to constraints, such as bandwidth constraints. As shown in hash-filled arrows in FIG. 6, the second routing path may include a first routing path portion from ground station 107*b* through link 134 to HAP 110*c*, a second routing path portion from HAP 110*c* through link 133 to HAP 110*b*, a third routing path portion from HAP 110*b* through link 132 to HAP 110*a*, and a fourth routing path portion from HAP 110*a* through link 130 to ground station 107*a*.

Figure 6:
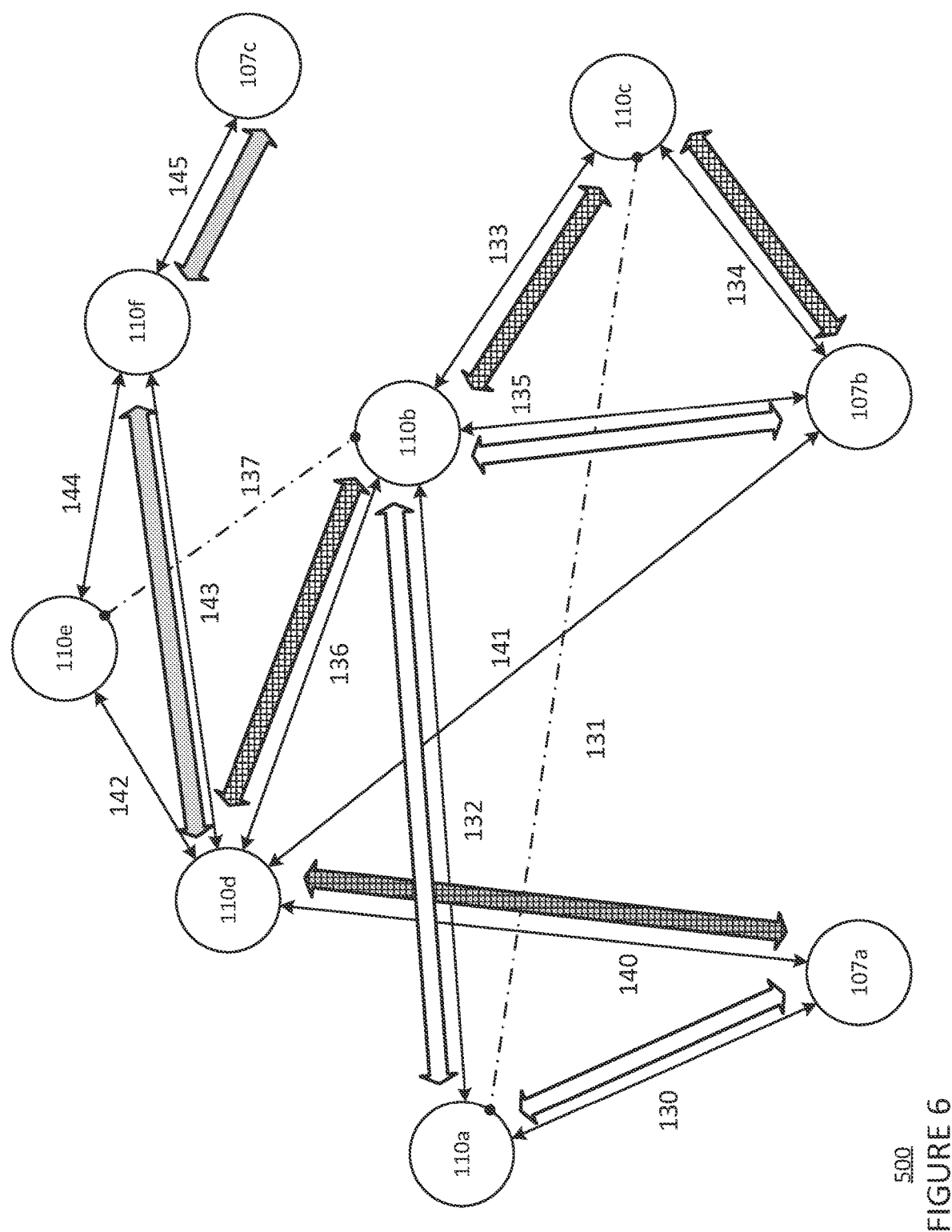
FIG. 6 is another functional diagram of the topology 500 of the network 100 shown in FIG. 1 in accordance with aspects of the disclosure.

As shown in grey-colored arrows in FIG. 6, a third routing path for additional client data may include a first routing path portion from ground station 107*a* through link 140 to HAP 110*d*, a second routing path portion from HAP 110*d* through link 143 to HAP 110*f*, and a third routing path portion form HAP 110*f* through link 145 to ground station 107*c*.

Figure 7:
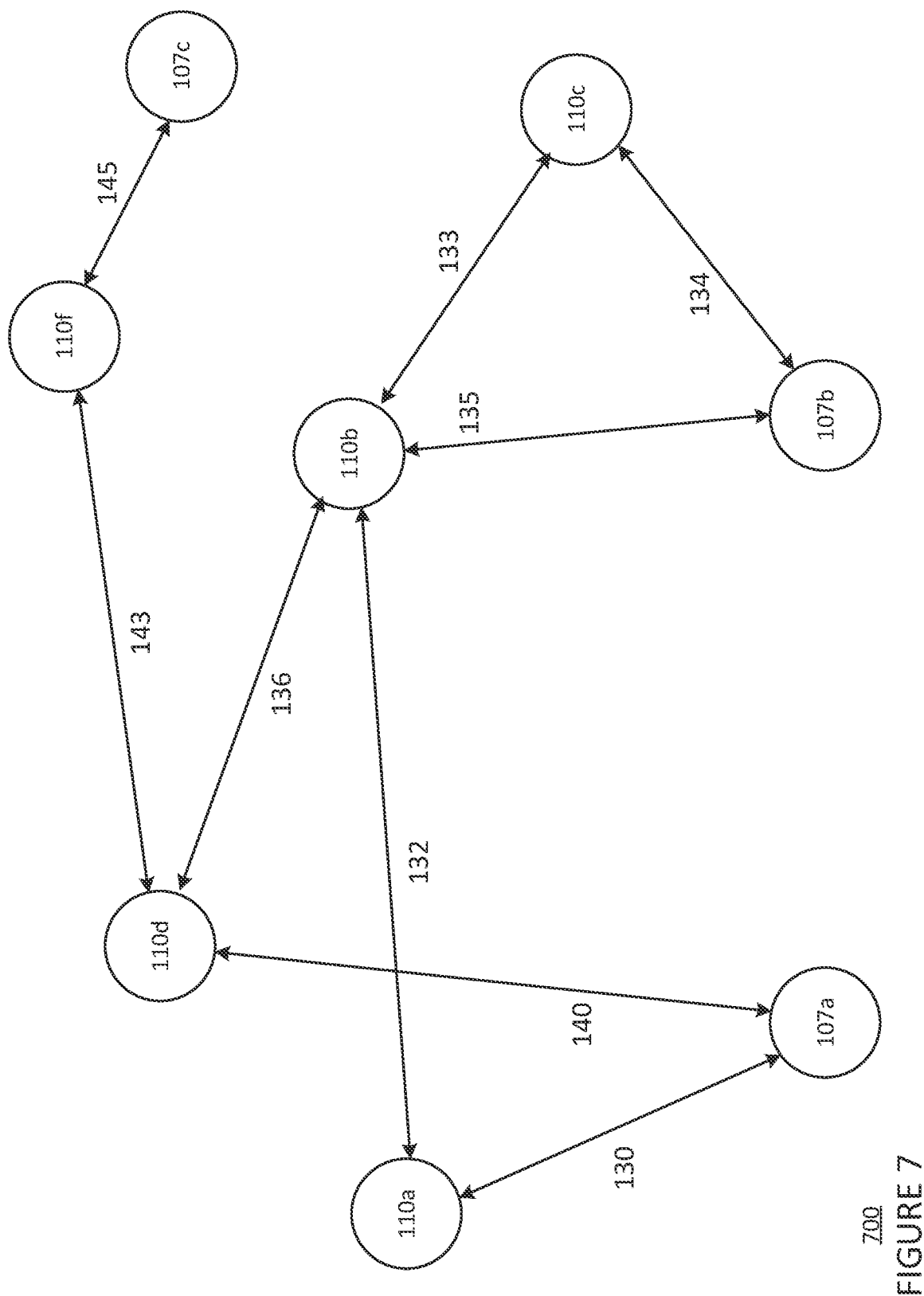
FIG. 7 is a functional diagram of a primary network configuration 700 of the network 100 in accordance with aspects of the disclosure.

Based on the routing paths for the client data to be transmitted through the network at the current time, the one or more processors 310 may determine the primary network configuration 700 to include the links 130, 132-136, 140, 143, and 145, as shown in FIG. 7. The other links need not be formed at the current time. Determining the primary network configuration 700 may also include determining first forwarding rules for each node based on the routing paths included in the primary network configuration. The first forwarding rules may be determined for each node along the path or may be determined for each client data. When determined for particular client data, the first forwarding rules may be sent to the source node and encapsulated in packets carrying the particular client data. The first forwarding rules may also include instructions regarding forming the links in the primary network configuration, such as pointing directions or beam configurations.

At block 412, a secondary network configuration 800 for network 100 may be determined at each available node at the network. In particular, the secondary network configuration may be determined by one or more processors at a given node using distributed routing protocol, such as mobile ad-hoc network routing protocol. For example, one or more next hops from the given node may be determined based on the nodes and links from the primary network configuration 700. The one or more processors at the given node may determine secondary routing paths from the given node to the network controller 300, one or more destination nodes, and/or an intermediate higher-level node. The secondary routing paths in the secondary network configuration may be different from the routing paths in the primary network configuration. There may be more or fewer possible secondary routing paths in the secondary network configuration than there are routing paths in the primary network configuration. The one or more processors at the given node may be regularly or continually determining the secondary network configuration based on available nodes and links in the network. Additionally or alternatively, the one or more processors at the given node may determine the secondary network configuration after receiving the available nodes or links from the network controller, such as based on nodes and links in the primary network configuration.

The one or more processors of the given node may then determine second forwarding rules from the given node based on the secondary routing paths. The second forwarding rules may be for proactive (table-driven) routing, reactive (on-demand) routing, hybrid (proactive and reactive) routing, or hierarchical routing. In some implementations, the second forwarding rules for the given node include next hop instructions for a secondary routing path between the given node and a destination node for client data. In other implementations, the second forwarding rules for the given node include next hop instructions to a next node associated with a desired destination node, rather than every node in the routing path to the desired destination node. In still other implementations, the second forwarding rules may include a table of the nodes and links of the primary configuration and a routing protocol. The one or more processors of the given node may then determine the routing path to take based on the table and the routing protocol, optionally after the table is updated to reflect any link failure or other changes in the topology.

Figure 8:
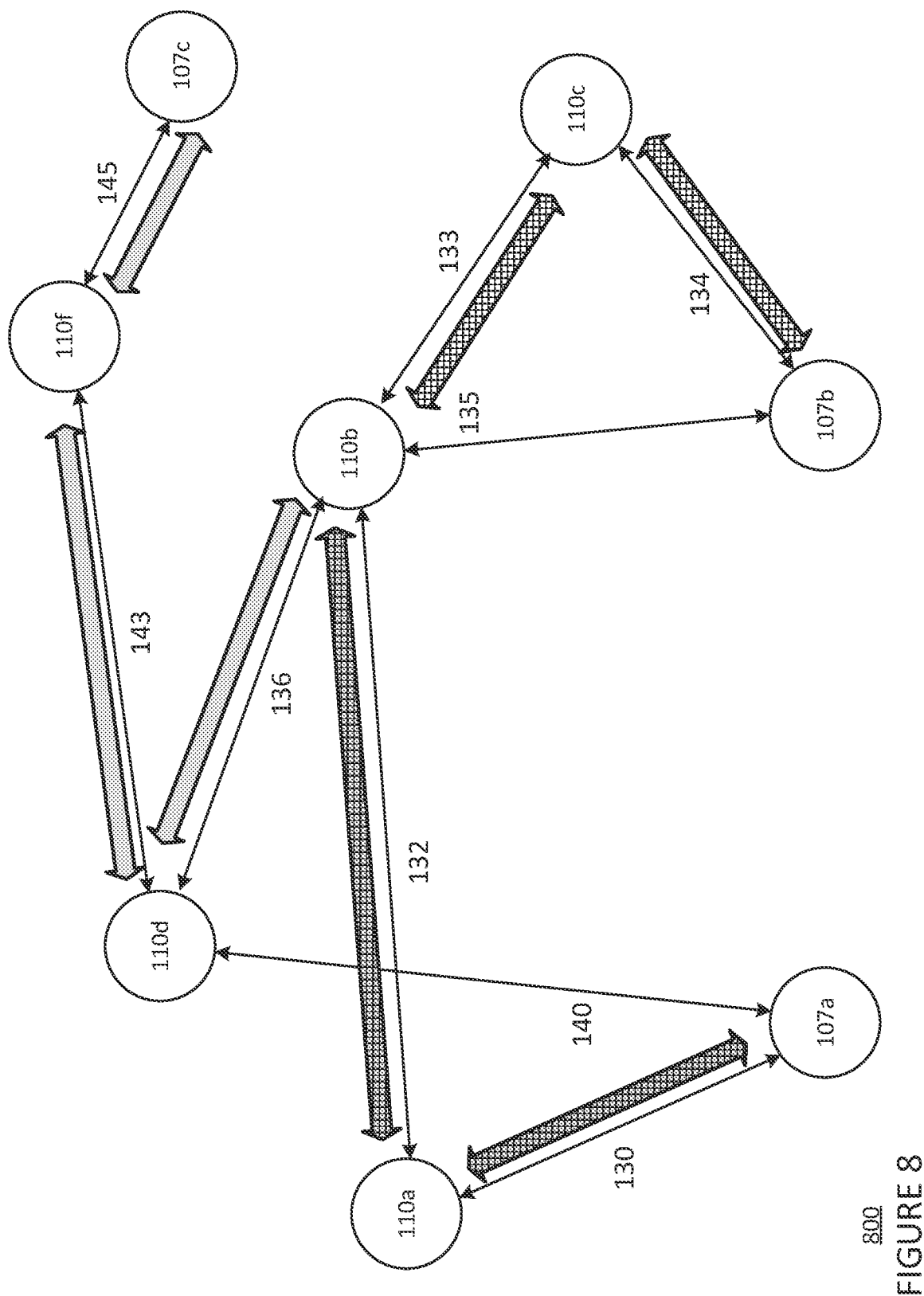
FIG. 8 is a functional diagram of a secondary network configuration 800 of the network 100 in accordance with aspects of the disclosure.

In the example shown in FIG. 8, the secondary network configuration 800 may include second forwarding rules for a first secondary routing path (hash-filled) and a second secondary routing path (grey-colored). Other secondary routing paths may be included in the secondary network configuration, but are not shown for the sake of clarity. The first secondary routing path may be determined as a back-up path for the first client data. The first secondary routing path is from ground station 107b through link 134 to HAP 110c, through link 133 to HAP 110b, through link 132 to HAP 110a, and through link 130 to ground station 107a. This secondary routing path differs from the routing path in the primary network configuration in that the link 135 between ground station 107b and HAP 110b is replaced by links 134 and 133 that connect to HAP 110c, which can be used in case of a failure in link 135. The second secondary routing path may be determined as a back-up path for the additional client data that is to be transmitted along the routing path in the primary network configuration between ground stations 107a and 107c. In particular, the second secondary routing path is from ground station 107a through link 130 to HAP 110a, through link 132 to HAP 110b, through link 136 to HAP 110d, through link 143 to HAP 110f, and through link 145 to ground station 107c. This secondary routing path differs from the routing path in the primary network configuration in that the link 140 between ground station 107a and HAP 110d is replaced by links 130, 132, and 136 that connect to HAPs 110a and 110b, which can be used in case of a failure in link 140.

As further shown in FIG. 4, at block 414, the one or more processors 310 of the network controller 300 may send implementation instructions to the nodes 107, 110 of the network 100 to cause the nodes of the network to implement of the primary network configuration and switch to the secondary network configuration for backup at the given point in time or during the given time frame. In the example scenario, for the primary network configuration, the implementation instructions to nodes 107, 110 may include instructions to form links and implement at least the routing path portions shown in FIG. 6. The implementation instructions may therefore include instructions to ground station 107a to point one or more transceivers of ground station 107a towards HAP 110a and 110d to form links 130 and 132, respectively; instructions to ground station 107b to point one or more transceivers of ground station 107b towards HAP 110b and 110c to form links 135 and 134, respectively; instructions to ground station 107c to point one or more transceivers of ground station 107c towards HAP 110f to form link 145; instructions to HAP 110a to point transceivers of HAP 110a towards ground station 107a and HAP 110b to form links 130 and 132, respectively; instructions to HAP 110b to point transceivers of HAP 110b towards ground station 107b, HAP 110a, HAP 110b, and HAP 110d to form links 135, 132, 133, and 136, respectively; instructions to HAP 110c to point transceivers of HAP 110c towards ground station 107b and HAP 110b to form links 134 and 133, respectively; instructions to HAP 110d to point transceivers of HAP 110d towards ground station 107a, HAP 110b, and HAP 110f to form links 140, 136, and 143, respectively; and instructions to HAP 110f to point transceivers of HAP 110f towards HAP 110d and ground station 107c to form links 143 and 145, respectively.

In some cases, one or more of the links in the primary network configuration may already be formed, in which case no change to the direction of the transceivers is necessary. In addition, the implementation instructions to ground station 107a or 107b, the start station, may include first forwarding rules for receipt and transmission of the client data to be transmitted via routing paths through a given network configuration. The first forwarding rules may include the source location of the client data, the destination location of the client data, the timing for transmission, and/or the rate for transmission. For example, when the first forwarding rules for the first client data are received at ground station 107b, the ground station 107b may be caused to transmit the first client data at the current time through the primary network configuration.

For a primary network configuration generated for a future time, a future time frame, or other point in time, the implementation instructions may include storing scheduled changes in the network 100, such as steering transceivers to implement new routing paths, at each node that may occur before transmitting client data at the future point in time. The implementation instructions may therefore include updating forwarding rules in forwarding tables at each node with new routing paths and time or a time frame for implementing the new routing paths according to the future network configuration. When the time or time frame arrives, the nodes 107, 110 of network 100 may be caused to automatically implement the future network configuration according to the implementation instructions.

The implementation instructions may also include instructions for preparing the network to implement the secondary network configuration when there is a failure in the primary network configuration at the same time or timeframe as the primary network configuration. In this case, the implementation instructions may include storing the second forwarding rules for implementing the secondary routing paths, such as those shown in FIG. 8, as a backup to the first forwarding rules of the primary network configuration. For example, the implementation instructions may include next hop instructions to ground station 107*a* to route the first client data to HAP 110*c* via link 134, next hop instructions to HAP 110*c* to route the first client data to HAP 110*b* via link 133, next hop instructions to ground station 107*b* to route the additional client data to HAP 110*a* via link 130, next hop instructions to HAP 110*a* to route the additional client data to HAP 110*b*, and next hop instructions to HAP 110*b* to route the additional client data to HAP 110*d*.

The implementations instructions may also include instructions to switch from implementing a first forwarding rule to implementing a second forwarding rule under certain circumstances. For example, the instructions to switch may include detecting when the first forwarding rule cannot be completed, such as when there is a link failure between a first node and a second node, when the transmitted client data is not received at a second node from a first node, or when the transmitted client data Is not received at a destination node within an expected amount of time. The instructions may then include implementing the second forwarding rule from the first node or from another node in the network in order to bypass the first forwarding rule that failed. In some examples, the instructions may include, before implementing the second forwarding rule, determining whether the second forwarding rule can be implemented or which second forwarding rule to implement based on the primary network configuration and the failed first forwarding rule.

Figure 9:
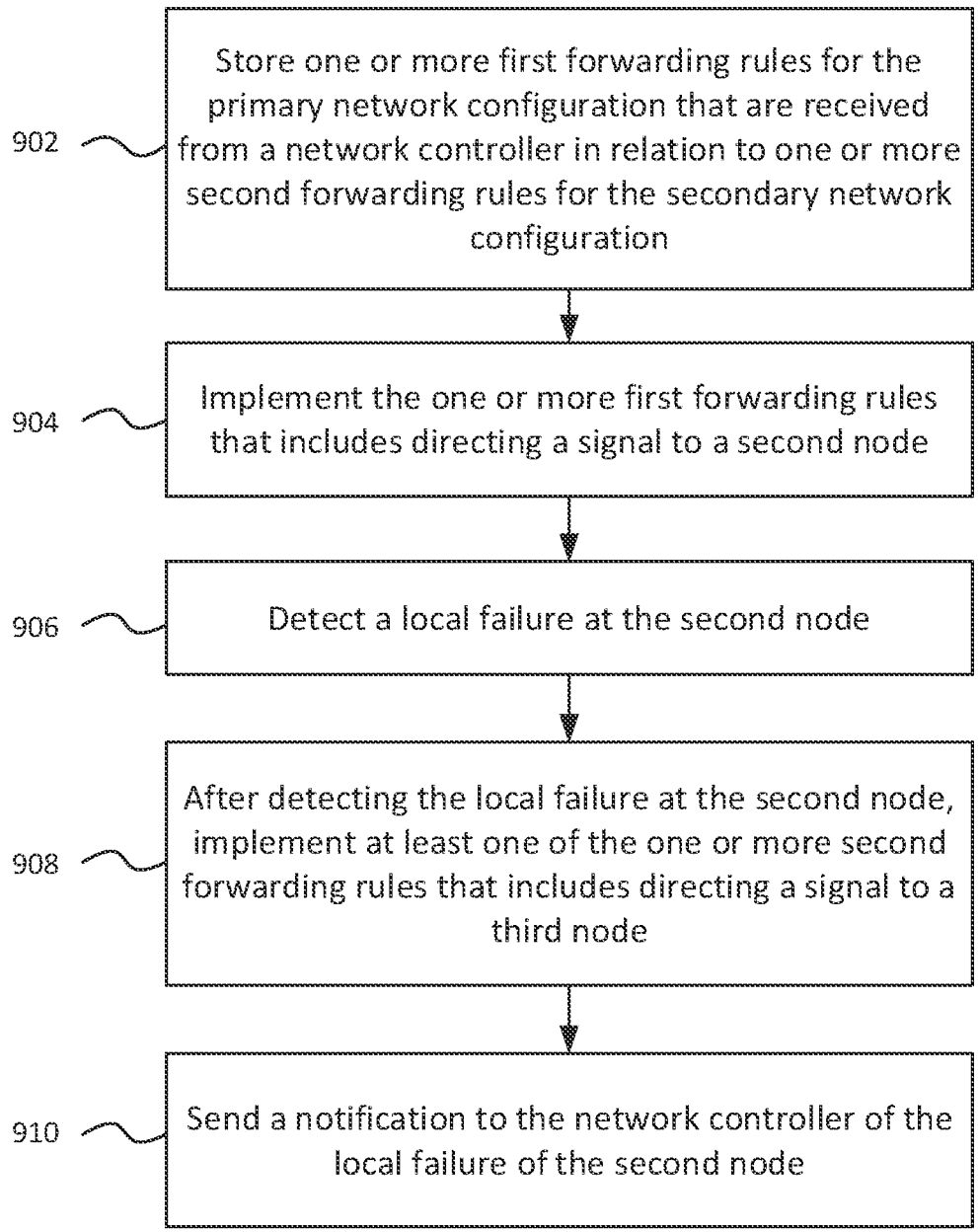
FIG. 9 is a flow diagram 900 of a method in accordance with aspects of the disclosure.

In FIG. 9, flow diagram 900 is shown in accordance with some of the aspects described above that may be performed by one or more processors a given node of the network, such as one or more processors 210 of HAP 110*a*. Additionally or alternatively, one or more processors 310 of the network controller 300 may perform one or more of the operations. While FIG. 9 shows blocks in a particular order, the order may be varied and that multiple operations may be performed simultaneously. Also, operations may be added or omitted.

At block 902, one or more processors of a first node that receives the implementation instructions, such as one or more processors of ground station 107*a*, may store one or more of the first forwarding rules for the primary network configuration in relation to one or more of the second forwarding rules for the secondary network configuration. The first forwarding rules and the second forwarding rules may be determined as described above with respect to flow diagram 400 in FIG. 4. In some implementations, the one or more second forwarding rules may be determined or updated by the one or more processors of the first node after receiving the first forwarding rules. Based on the implementation instructions, the one or more first forwarding rules may be stored with a higher priority than the one or more second forwarding rules. The higher priority of the one or more first forwarding rules may cause the one or more first forwarding rules to be implemented at a given point in time unless one of the first forwarding rules can no longer be implemented. For example, at ground station 107*a*, a first forwarding rule for the additional client data may be a next hop to HAP 110*d* via link 140 toward a destination of ground station 107*c*, and a second forwarding rule for the additional client data may be a next hop to HAP 110*a* via link 130 toward the destination of ground station 107*c*.

At block 904, the one or more processors of the first node may implement the one or more first forwarding rules that includes directing a signal to a second node at the given point in time. Implementing the one or more first forwarding rules may include establishing a link with the second node. For example, to implement a first forwarding rule in the one or more first forwarding rules, the first node may physically or electronically align an antenna with the second node that is a next hop in the network according to a routing path. The first node may also adjust one or more signal characteristics for a link with the second node in the network. For ground station 107*a*, the one or more processors of ground station 107*a* may cause at least one transceiver to be pointed towards location D to form link 140 with HAP 110*d* according to the first forwarding rule. HAP 110*d* may likewise point at least one transceiver towards ground station 107*a* to be positioned to receive a signal from the ground station 107*a*. The at least one transceiver of the ground station 107*a* may be configured with a particular frequency band or other signal characteristic for the link. The additional client data may be transmitted from the ground station 107*a* to HAP 110*d* on link 140.

At block 906, the first node may detect a local failure at the second node. The local failure at the second node may be detected when communication with the second node cannot be established. Alternatively, the local failure may be detected when a communication indicating that the second node is offline or otherwise unreachable is received at the first node from the network controller or a third of the network. For example, the one or more processors of ground station 107*a* may determine that HAP 110*d* has experienced a local failure when link 140 cannot be established or when a weather communication is received indicating that a storm is positioned between the ground station 107*a* and HAP 110*d*, rendering HAP 110*d* unreachable for a time period.

At block 908, after the local failure at the second node is detected, the first node may implement at least one of the one or more second forwarding rules that includes directing a signal to a third node. The one or more second forwarding rules may be stored in the memory of the first node or may be determined after the local failure is detected. In some implementations, the at least one second forwarding rule may be selected from the one or more second forwarding rules based on a destination for data or based on an available intermediate node between the first node the destination. Implementing the at least one second forwarding rule may include establishing a link with the third node. Alternatively, the link with the third node may already exist from the primary configuration, and implementing the at least one second forwarding rule may include redirecting a signal from a first port pointed towards the second node to a second port pointed towards the third node. For example, the one or more processors of ground station 107*a* may switch to transmitting the additional client data to HAP 110*a* on link 130. Because link 130 has already been formed for routing the first client data, HAP 110*a* is already positioned to receive communication from ground station 107*a*.

In some examples, the first node may send a notification to the network controller of the local failure of the second node, as shown in block 910. In other examples, the network controller may detect the local failure of the second node using other nodes or other sensors in communication with the network controller.

The network controller may generate an updated primary configuration to adjust for the local failure of the second node. The updated primary configuration may be an overall configuration generated using software-defined networking in a same or similar manner as the first primary configuration. Once generated, updated forwarding rules for the updated primary configuration may be sent to the nodes of the network to be implemented. The updated primary configuration may replace any of the one or more first forwarding rules and the one or more second forwarding rules being implemented by the nodes of the network.

In some alternative implementations, the network controller may determine the secondary network configuration to backup the primary network configuration, including one or more second forwarding rules, and transmit the one or more second forwarding rules to the respective nodes in a same or similar manner as the one or more first forwarding rules are transmitted.

The technology allows for a more reliable software-defined network. Communications may be transmitted with less latency and less packet loss during events such as a local failure, while maintaining a global optimality of the software-defined network. For example, when the control plane of a primary network is carried over to a secondary network after the local failure of the primary network, the primary network may have a shorter healing time. As a result, client data may be sent and received faster or more on schedule than in other networks. The network may be capable of supporting transmission of a greater amount of data overall.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
a network controller in communication with a plurality of nodes of a network, the plurality of nodes including a first node that is in motion relative to a second node, wherein the first node is a high altitude platform; and
wherein the network controller includes one or more processors, the one or more processors being configured to:
receive node information from the plurality of nodes of the network, wherein the node information includes location information and flight information for the first node;
determine current and predicted paths for the first node based on the location information and the flight information;
determine available nodes and possible links in the network based on the received node information;
determine a current topology and a future topology of the network based on the available nodes and possible links;
receive, from one or more client devices, client data information related to client data to be transmitted through the network, the client data including at least a destination node;
determine a primary network configuration for the current topology, wherein the primary network configuration includes one or more first routing paths for the client data;
determine a first forwarding rule for each node of the network based on the one or more first routing paths;
determine a secondary network configuration for the future topology, wherein the secondary network configuration includes one or more second routing paths for the client data;
determine a second forwarding rule for each node of the network based on the secondary network configuration; and
send implementation instructions to the plurality of nodes of the network, wherein the implementation instructions cause storage of the first forwarding rule and the second forwarding rule, the first forwarding rule having a higher priority of implementation than the second forwarding rule at each of the plurality of nodes, and cause the plurality of nodes to implement the primary network configuration and to switch to the secondary network configuration under a circumstance, wherein the circumstance includes transmitted client data not being received at the destination node.

2. The system of claim 1, wherein the implementation instructions further cause each node of the network to determine a next hop in the secondary network configuration using mobile ad-hoc networking in the determined topology.

3. The system of claim 1, wherein the implementation instructions include the first forwarding rule.

4. The system of claim 1, wherein the first forwarding rule includes instructions regarding forming a link in the primary network configuration.

5. The system of claim 1, wherein the implementation instructions for each node of the network further includes determining whether the second forwarding rule can be implemented before implementing the second forwarding rule.

6. A system comprising:
a network controller in communication with a plurality of nodes of a network, the plurality of nodes including a first node that is in motion relative to a second node, wherein the first node is a high altitude platform; and
wherein the network controller includes one or more processors, the one or more processors being configured to:
receive node information from the plurality of nodes of the network, wherein the node information includes location information and flight information of the first node;

determine current and predicted paths for the first node based on the location information and the flight information;
determine available nodes and possible links in the network based on the received node information;
determine a current topology and a future topology of the network based on the available nodes and possible links;
receive, from one or more client devices, client data information related to client data to be transmitted through the network, the client data including at least a destination node;
determine a primary network configuration for the current determined topology, wherein the primary network configuration includes one or more first routing paths for the client data;
determine a first forwarding rule for each node of the network based on the one or more first routing paths;
determine a secondary network configuration for the future topology, wherein the secondary network configuration includes one or more second routing paths for the client data;
determine a second forwarding rule for each node of the network based on the secondary network configuration; and
implement instructions to the plurality of nodes of the network, wherein the implementation instructions cause storage of the first forwarding rule and the second forwarding rule, the first forwarding rule having a higher priority of implementation than the second forwarding rule at each of the plurality of nodes, and cause the plurality of nodes to implement the primary network configuration under a circumstance, wherein the circumstance includes transmitted client data not being received at the destination node.

7. The system of claim 6, wherein the implementation instructions further cause each node of the network to determine a next hop in the secondary network configuration using mobile ad-hoc networking in the determined topology.

8. The system of claim 6, wherein the implementation instructions include the first forwarding rule.

9. The system of claim 6, wherein the first forwarding rule includes instructions regarding forming a link in the primary network configuration.

10. The system of claim 6, wherein the second forwarding rule is for proactive routing.

11. The system of claim 6, wherein the second forwarding rule is for reactive routing.

12. The system of claim 6, wherein the second forwarding rule is for hybrid routing.

13. The system of claim 6, wherein the implementation instructions further include detecting a link failure to a next hop before switching to the second forwarding rule.

14. A computer-implemented method comprising:
receiving, by one or more processors in communication with a plurality of nodes of a network, node information from the plurality of nodes of the network, the plurality of nodes including a first node that is in motion relative to a second node, wherein the first node is a high altitude platform, and wherein the node information includes location information and flight information for the first node;
determining, by the one or more processors, current and predicted paths for the first node based on the location information and the flight information;
determining, by the one or more processors, available nodes and possible links in the network based on the received node information;
determining, by the one or more processors, a current topology and a future topology of the network based on the available nodes and possible links;
receiving, by the one or more processors from one or more client devices, client data information related to client data to be transmitted through the network, the client data including at least a destination node;
determining, by the one or more processors, a primary network configuration for the current topology, wherein the primary network configuration includes one or more first routing paths for the client data;
determine a first forwarding rule for each node of the network based on the one or more first routing paths;
determine a secondary network configuration for the future topology, wherein the secondary network configuration includes one or more second routing paths for the client data;
determine a second forwarding rule for each node of the network based on the secondary network configuration; and
send implementation instructions to the plurality of nodes of the network, wherein the implementation instructions cause storage of the first forwarding rule and the second forwarding rule, the first forwarding rule having a higher priority of implementation than the second forwarding rule at each of the plurality of nodes, and cause the plurality of nodes to implement the primary network configuration and to switch to the secondary network configuration under a circumstance, wherein the circumstance includes transmitted client data not being received at the destination node.

15. The method of claim 14, wherein the implementation instructions further cause each node of the network to determine a next hop in the secondary network configuration using mobile ad-hoc networking in the determined topology.

16. The method of claim 14, wherein the implementation instructions include the first forwarding rule.

17. The method of claim 14, wherein the first forwarding rule includes instructions regarding forming a link in the primary network configuration.

18. The method of claim 14, wherein the second forwarding rule is for proactive routing.

19. The method of claim 14, wherein the second forwarding rule is for reactive routing.

20. The method of claim 14, wherein the second forwarding rule is for hybrid routing.

* * * * *